US008433826B2

(12) United States Patent  (10) Patent No.: US 8,433,826 B2
Issa  (45) Date of Patent: *Apr. 30, 2013

(54) PROXY CACHING IN A PHOTOSHARING PEER-TO-PEER NETWORK TO IMPROVE GUEST IMAGE VIEWING PERFORMANCE

(75) Inventor: Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,741

(22) Filed: Jul. 2, 2012

(65) Prior Publication Data

US 2012/0271905 A1  Oct. 25, 2012

Related U.S. Application Data

(63) Continuation of application No. 10/927,291, filed on Aug. 25, 2004, now Pat. No. 8,234,414, which is a continuation-in-part of application No. 10/813,839, filed on Mar. 31, 2004, now abandoned.

(51) Int. Cl.
*G06F 15/16* (2006.01)

(52) U.S. Cl.
USPC .......................................... 709/248; 709/203

(58) Field of Classification Search .................. 709/203, 709/213–219, 248
See application file for complete search history.

(56) References Cited

U.S. PATENT DOCUMENTS

| | | | |
|---|---|---|---|
| 5,414,455 A | 5/1995 | Hooper et al. | |
| 5,915,252 A | 6/1999 | Misheski et al. | |
| 5,918,013 A | 6/1999 | Mighdoll et al. | |
| 6,073,168 A | 6/2000 | Mighdoll et al. | |
| 6,292,835 B1 | 9/2001 | Huang et al. | |
| 6,330,606 B1 | 12/2001 | Logue et al. | |
| 6,349,336 B1 | 2/2002 | Sit et al. | |
| 6,449,657 B2 | 9/2002 | Stanbach, Jr. et al. | |
| 6,463,508 B1 | 10/2002 | Wolf et al. | |
| 6,487,538 B1 | 11/2002 | Gupta et al. | |
| 6,490,615 B1 | 12/2002 | Dias et al. | |

(Continued)

FOREIGN PATENT DOCUMENTS

| | | |
|---|---|---|
| JP | 2003341150 A | 12/2003 |
| WO | 2005099165 A2 | 10/2005 |
| WO | 2006026193 A2 | 3/2006 |

OTHER PUBLICATIONS

Fielding, R., et al., "Hypertext Transfer Protocol—HTTP/1.1," Request for Comments (RFC) 2616, Internet Engineering Task Force (IETF) Network Working Group, Jun. 1999, 136 pages, http://tools.ietf.org/pdf/rfc2616.pdf.

(Continued)

*Primary Examiner* — Brendan Higa
(74) *Attorney, Agent, or Firm* — Withrow & Terranova, PLLC (57) ABSTRACT

The present invention provides a method and system for serving an image stored in the peer computer to a requesting computer in a network photosharing system in which the peer computer is coupled to a photosharing system server. Aspects of the invention include caching copy of the image in the photosharing server; and in response to the photosharing server receiving a request from the requesting computer to view the image stored in the peer computer, transmitting the cached image from the photosharing server to the requesting computer, thereby avoiding the need to transfer the image from the peer computer to the photosharing server for each request to view the image.

38 Claims, 6 Drawing Sheets

U.S. PATENT DOCUMENTS

| | | | |
|---|---|---|---|
| 6,553,409 B1* | 4/2003 | Zhang et al. ............... 709/213 |
| 6,564,218 B1 | 5/2003 | Roth |
| 6,622,168 B1 | 9/2003 | Datta |
| 6,631,369 B1 | 10/2003 | Meyerzon et al. |
| 6,651,141 B2 | 11/2003 | Adrangi |
| 6,658,463 B1 | 12/2003 | Dillon et al. |
| 6,697,850 B1 | 2/2004 | Saunders |
| 6,754,699 B2 | 6/2004 | Swildens et al. |
| 6,757,684 B2 | 6/2004 | Svendsen et al. |
| 6,757,705 B1 | 6/2004 | Pardikar et al. |
| 6,859,807 B1 | 2/2005 | Knight et al. |
| 6,917,965 B2 | 7/2005 | Gupta et al. |
| 6,925,485 B1 | 8/2005 | Wang et al. |
| 6,934,735 B1 | 8/2005 | Emens et al. |
| 6,944,651 B2 | 9/2005 | Onyon et al. |
| 6,954,752 B2 | 10/2005 | Iyengar |
| 7,027,513 B2 | 4/2006 | Zhang et al. |
| 7,039,784 B1 | 5/2006 | Chen et al. |
| 7,043,644 B2 | 5/2006 | DeBruine |
| 7,089,301 B1 | 8/2006 | Labio et al. |
| 7,092,699 B1 | 8/2006 | Hefter |
| 7,181,438 B1 | 2/2007 | Szabo |
| 7,272,645 B2 | 9/2007 | Chang et al. |
| 7,587,446 B1 | 9/2009 | Onyon et al. |
| 7,698,386 B2* | 4/2010 | Amidon et al. ............... 709/219 |
| 2002/0023143 A1 | 2/2002 | Stephenson et al. |
| 2002/0023230 A1 | 2/2002 | Bolnick et al. |
| 2002/0046262 A1 | 4/2002 | Heilig et al. |
| 2002/0062384 A1 | 5/2002 | Tso |
| 2002/0065879 A1 | 5/2002 | Ambrose et al. |
| 2002/0078134 A1 | 6/2002 | Stone et al. |
| 2002/0103998 A1 | 8/2002 | DeBruine |
| 2002/0107934 A1 | 8/2002 | Lowery et al. |
| 2002/0133601 A1 | 9/2002 | Kennamer et al. |
| 2002/0138744 A1 | 9/2002 | Schleicher et al. |
| 2002/0178261 A1 | 11/2002 | Chang et al. |
| 2003/0005035 A1 | 1/2003 | Rodgers |
| 2003/0009538 A1 | 1/2003 | Shah et al. |
| 2003/0018639 A1 | 1/2003 | Iyengar |
| 2003/0046586 A1 | 3/2003 | Bheemarasetti et al. |
| 2003/0050863 A1 | 3/2003 | Radwin |
| 2003/0061272 A1 | 3/2003 | Krishnamurthy et al. |
| 2003/0063770 A1 | 4/2003 | Svendsen et al. |
| 2003/0063771 A1 | 4/2003 | Morris et al. |
| 2003/0069968 A1 | 4/2003 | O'Neil et al. |
| 2003/0084162 A1 | 5/2003 | Johnson et al. |
| 2003/0105812 A1 | 6/2003 | Flowers, Jr. et al. |
| 2003/0112823 A1 | 6/2003 | Collins et al. |
| 2003/0154306 A1 | 8/2003 | Perry |
| 2003/0191832 A1 | 10/2003 | Satyavolu et al. |
| 2003/0195940 A1 | 10/2003 | Basu et al. |
| 2003/0225885 A1 | 12/2003 | Rochberger et al. |
| 2004/0054860 A1 | 3/2004 | Dixit et al. |
| 2004/0064512 A1 | 4/2004 | Arora et al. |
| 2004/0064568 A1 | 4/2004 | Arora et al. |
| 2004/0064693 A1 | 4/2004 | Pabla et al. |
| 2004/0068579 A1 | 4/2004 | Marmigere et al. |
| 2004/0070678 A1* | 4/2004 | Toyama et al. ............ 348/231.3 |
| 2004/0088348 A1 | 5/2004 | Yeager et al. |
| 2004/0098447 A1 | 5/2004 | Verbeke et al. |
| 2004/0139172 A1 | 7/2004 | Svendsen et al. |
| 2004/0139227 A1 | 7/2004 | Takeda |
| 2004/0148434 A1 | 7/2004 | Matsubara et al. |
| 2004/0162871 A1 | 8/2004 | Pabla et al. |
| 2004/0215625 A1 | 10/2004 | Svendsen et al. |
| 2005/0066063 A1 | 3/2005 | Grigorovitch et al. |
| 2005/0071496 A1 | 3/2005 | Singal et al. |
| 2005/0086386 A1 | 4/2005 | Shen et al. |
| 2005/0091160 A1 | 4/2005 | Kitze et al. |
| 2005/0091220 A1 | 4/2005 | Klemow |
| 2005/0097085 A1 | 5/2005 | Shen et al. |
| 2005/0114711 A1 | 5/2005 | Hesselink et al. |
| 2005/0114757 A1 | 5/2005 | Sahota et al. |
| 2005/0138176 A1* | 6/2005 | Singh et al. ............... 709/226 |
| 2005/0147044 A1 | 7/2005 | Teodosiu et al. |
| 2005/0160167 A1 | 7/2005 | Cheng et al. |
| 2005/0193083 A1 | 9/2005 | Han et al. |
| 2005/0198125 A1 | 9/2005 | Macleod Beck et al. |
| 2005/0198191 A1 | 9/2005 | Carlson et al. |
| 2005/0229243 A1 | 10/2005 | Svendsen et al. |
| 2005/0246634 A1* | 11/2005 | Ortwein et al. ............... 715/530 |
| 2005/0267973 A1 | 12/2005 | Carlson et al. |
| 2006/0004691 A1 | 1/2006 | Sifry |
| 2006/0010225 A1 | 1/2006 | Issa |
| 2006/0064716 A1 | 3/2006 | Sull et al. |
| 2006/0136551 A1* | 6/2006 | Amidon et al. ............... 709/203 |
| 2006/0218275 A1 | 9/2006 | Labio et al. |
| 2007/0180075 A1 | 8/2007 | Chasman et al. |
| 2007/0271380 A1 | 11/2007 | Chang et al. |
| 2008/0178234 A1 | 7/2008 | Eyal et al. |

OTHER PUBLICATIONS

Lee, Sung-Ju, et al., "An Interactive Video Delivery and Caching System Using Video Summarization," (article), Mar. 2002, pp. 1-9, Computer Communications, vol. 25, No. 4.

Lerner, Reuven M., "At the Forge Aggregating Syndication Feeds," (article), Linux Journal, 2004, 7 pages, vol. 2004, No. 128.

Lerner, Reuven M., "At the Forge Aggregating with Atom," (article), Linux Journal, 2004, 7 pages, vol. 2004, No. 127.

Lerner, Reuven M., "At the Forge Bloglines Web Services, Continued," (article), Linux Journal, 2005, 7 pages, vol. 2005, No. 131.

Lerner, Reuven M., "At the Forge Syndication with RSS," (article), Linux Journal, 2004, 9 pages, vol. 2004, No. 126.

Lerner, Reuven M., "At the Forge: Bloglines Web Services," (article), Linux Journal, 2005, 6 pages, vol. 2005, No. 129.

No Author, "Broadcatching—Wikipedia, the free encyclopedia", (website), obtained Mar. 5, 2008, 3 pages, http://en.wikipedia.org/wiki/Broadcatching.

Parker, Jason, "An Easy Way to Share Digital Photos with Others," ZDNet AnchorDesk Editorial Feature, Jun. 13, 2003, 1 page, http://reviews-zdnet.com/AnchorDesk/4630-7298_16-4208032.html.

Raymond, Scott, "Broadcatching with BitTorrent," (article), Dec. 16, 2003, 3 pages, http://web.archive.org/web/20040213093750/http://scottraymond.net/archive/4745.

Sandler, Dan, et al., "feedtree: Sharing Web micronews with peer-to-peer event notification," Feb. 24, 2005, 20 pages.

Unknown, "Squid Web Proxy Cache", http://www.squid-cache.org/, updated May 20, 2006, accessed May 22, 2006, 1 page, http://www.squid-cache.org.

Unknown, "Welcome!—The Apache Software Foundation", The Apache Software Foundation, copyright 1999-2006, accessed May 22, 2006, 2 pages, http://www.apache.org/.

Unknown, "Cache from High Definition: A-Z Guide to Personal Technology", CREDOreference, Houghton Mifflin Company, accessed Jul. 18, 2011, Copyright Date 2006, 2 pages, http://www.credoreference.com/entry/hmhighdef/cache.

Yoshida, A., "Practical use and selection," Nikkei Open Systems, Nikkei Business Publications, Inc., Apr. 15, 2002, 13 pages, vol. 109, Japan.

International Search Report mailed Oct. 23, 2006, for International Patent Application No. PCT/US05/29561, 2 pages.

International Search Report mailed Nov. 8, 2006, for International Patent Application No. PCT/US05/41287, 3 pages.

International Search Report mailed Apr. 3, 2008, for International Patent Application No. PCT/US06/27953, 5 pages.

Supplementary European Search Report completed Sep. 20, 2007, for European Patent Application No. 05787556.9, 3 pages.

Non-Final Rejection mailed Aug. 24, 2006, for U.S. Appl. No. 10/927,291, 14 pages.

Non-Final Rejection mailed Feb. 6, 2007, for U.S. Appl. No. 10/927,291, 11 pages.

Final Rejection mailed Jun. 25, 2007, for U.S. Appl. No. 10/927,291, 14 pages.

Non-Final Rejection mailed Sep. 13, 2007, for U.S. Appl. No. 10/927,291, 12 pages.

Final Rejection mailed Mar. 17, 2008, for U.S. Appl. No. 10/927,291, 17 pages.

Advisory Action mailed Jun. 16, 2008, for U.S. Appl. No. 10/927,291, 3 pages.

Examiner's Answer to Appeal Brief mailed Nov. 12, 2008, for U.S. Appl. No. 10/927,291, 22 pages.

Decision on Appeal from the Board of Patent Appeal and Interferences mailed Jun. 8, 2011, for U.S. Appl. No. 10/927,291, 9 pages.
Non-Final Rejection mailed Oct. 25, 2011, for U.S. Appl. No. 10/927,291, 19 pages.
Notice of Allowance mailed Mar. 8, 2012, for U.S. Appl. No. 10/927,291, 11 pages.

Supplemental Notice of Allowability mailed Apr. 6, 2012, for U.S. Appl. No. 10/927,291, 7 pages.
Supplemental Notice of Allowability mailed Jun. 27, 2012, for U.S. Appl. No. 10/927,291, 2 pages.

* cited by examiner

FIG. 5
Peer Proxy Flow

PROXY CACHING IN A PHOTOSHARING PEER-TO-PEER NETWORK TO IMPROVE GUEST IMAGE VIEWING PERFORMANCE

CROSS-REFERENCE TO RELATED APPLICATIONS

The present invention is a continuation of U.S. patent application Ser. No. 10/927,291 filed on Aug. 25, 2004, which was a continuation-in-part of abandoned U.S. patent application Ser. No. 10/813,839, filed Mar. 31, 2004, the disclosures of both application are hereby incorporated by reference in its entirety and the present application claims priority to both applications.

FIELD OF INVENTION

The present invention relates to sharing digital images over a network, and more particularly to a method and system for improving guest viewing performance of images stored on peer computers in a photosharing peer-to-peer network.

BACKGROUND OF THE INVENTION

Over the past several years, photosharing has become widely accepted by photo enthusiasts. Many websites currently exist that allow users to upload digital images to the site for storage on a server and for viewing by others over the Internet. Oftentimes, images are grouped to form an album web page so that the user can invite others to view the album web page, as opposed to each individual image.

This approach to photosharing, however, presents some disadvantages. In particular, users are required to upload digital images to the site, which can be time consuming, and the site requires extensive storage capacity to store the images of all the users, which can become expensive.

To address these concerns, the assignee of the present invention has developed a web-based peer-to-peer photosharing system in which all workstations and computers (peers) in the network store images locally and act as servers to other users on the network. A central site accessible by all the peers provides additional functionality, such as coordinating the peers, providing search capabilities for the peers, purchase order fulfillment, etc.

Figure 1A:
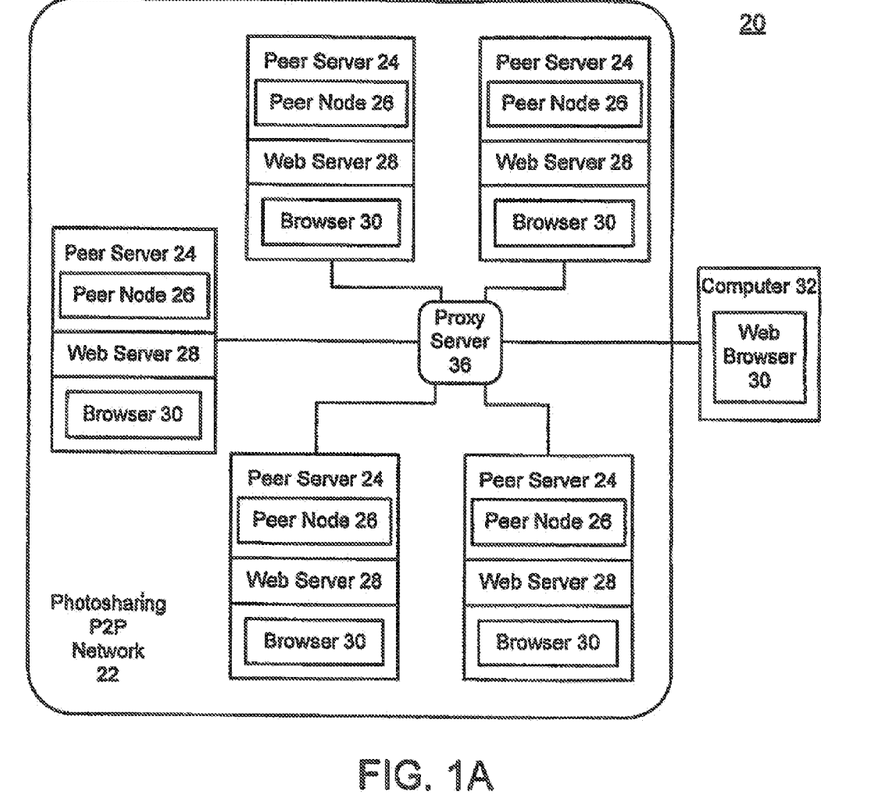
FIG. 1A is a block diagram illustrating an exemplary web-based peer-to-peer environment.

FIG. 1A is a block diagram illustrating the web-based peer-to-peer photosharing system. The peer-to-peer photosharing system 20 includes a photosharing P2P network 22, which comprises multiple peer servers 24 running peer node software 26 and web server software 28. The peer node and server software 24 and 26 enable the users of the computers to share images with others in the network 22 through a web browser 30 without having to upload their pictures to a web site. A novel feature of the photosharing P2P network 22 is that it provides a hybrid peer-to-peer architecture for general HTTP/web browser configuration that incorporates a central proxy server 36 to coordinate networking traffic for peers behind firewalls, thus allowing access to peers behind firewalls by other peers and by visiting computers 32 not in the network 22. The proxy server 36 provides supporting services to the peers 24 as well as providing a path through which the visiting computer 32 accesses images from the peer servers 24 via a standard web browser 30. Allowing generic HTTP access to the images hosted on peer servers located behind firewalls becomes increasingly important as virtually all corporations use firewalls, and the use of software firewalls installed on user's home systems is becoming ubiquitous.

Figure 1B:
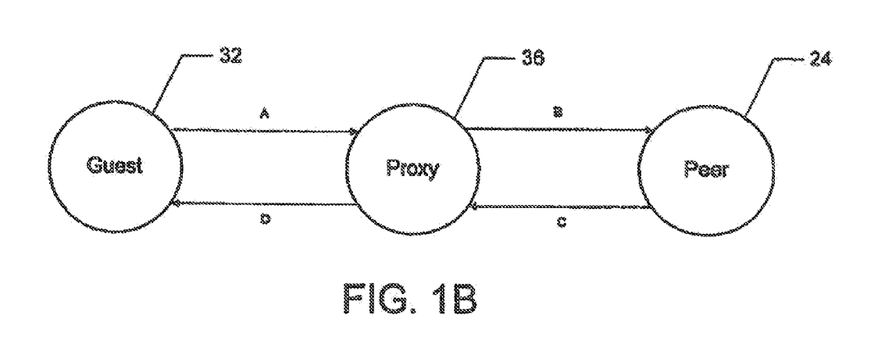
FIG. 1B is a diagram illustrating data paths used when an image is served from one of the peers to a visiting computer through the proxy server.

FIG. 1B is a diagram illustrating the data paths used when an image is served from one of the peers 24 to a visiting computer 32 through the proxy server 36. The process begins when a guest initiates a request from the web browser 30 of the visiting computer 32 to view an image, which is routed to the proxy server 36 via path (A). The proxy server 36 then routes the request to the peer server 24 via path (B). The peer server 24 services the request and returns the image to the proxy server via path (C). The proxy server 36 then sends the image to the visiting computer 32 for display via path (D).

One problem with routing images through the proxy server 36 is that it requires extra bandwidth. That is, the image must be moved twice; once from the peer server 24 to the proxy server 36, and then a second time from the proxy server 36 to the visiting computer 32. In addition, path (C) generally has the longest latency because the peer server 24 is typically hosted in a user's home equipped with a cable modem or DSL that has an uplink speed (path C) much slower that the downlink speed (path B). Thus, users may experience a significant delay when viewing images that are routed through the proxy server 36 due to the bandwidth limitations between the peer server 24 and the proxy server 36 path (C).

Accordingly, there is need for a method and system for reducing the amount of network traffic between the peer server and the proxy server (path (C)) in order to improve guest image viewing performance. The present invention addresses such a need.

BRIEF SUMMARY OF THE INVENTION

The present invention provides a method and system for serving an image stored in a peer computer to a requesting computer in a network photosharing system in which the peer computer is coupled to a photosharing server, such the proxy server described above. Aspects of the invention include caching copy of the image in the photosharing server; and in response to the photosharing server receiving a request from the requesting computer to view the image stored in the peer computer, transmitting the cached image from the photosharing server to the requesting computer, thereby avoiding the need to transfer the image from the peer computer to the photosharing server for each request to view the image. In a second aspect of the present invention, prior to serving the cached image to the requesting computer, the photosharing server determines whether the cached image has been modified since being cached by sending an HTTP request with a timestamp of the cached image to the peer computer. The peer computer then compares the timestamp of the cached image with the timestamp of the image stored on the peer, and sends a response to the photosharing server indicating whether the image has been modified based on whether the timestamps match or not. If the image has been modified, then the modified image is cached on the photosharing server and served to the requesting computer. In another aspect of the present invention, the images stored on the peer computer are automatically synchronized with the images on the photosharing server so that the photosharing server always serves the most up-to-date version of the image to requestors.

According to the method and system disclosed herein, caching the image in the photosharing server avoids the need to transfer the image from the peer computer to the photosharing server (path (C)) for each request to view the image. Thus, the present invention greatly reduces network traffic between the peer computer and the photosharing server and increases image viewing performance of the photosharing network.

DETAILED DESCRIPTION OF THE INVENTION

The present invention relates to sharing digital images over a network, and more particularly to a method and system for improving guest image viewing performance. The following description is presented to enable one of ordinary skill in the art to make and use the invention and is provided in the context of a patent application and its requirements. Various modifications to the preferred embodiments and the generic principles and features described herein will be readily apparent to those skilled in the art. For example, although the preferred embodiment is in the context of a peer-to-peer network, the same principles can be applied to a client-server environment where the guest browser communicates directly with the computer system storing the album and images. Thus, the present invention is not intended to be limited to the embodiments shown but is to be accorded the widest scope consistent with the principles and features described herein.

The present invention provides a method and system for improving the viewing performance of a peer-to-peer photosharing network in which peer servers store their user's images and are coupled to at least one photosharing system server, such as a proxy server.

Figure 2:
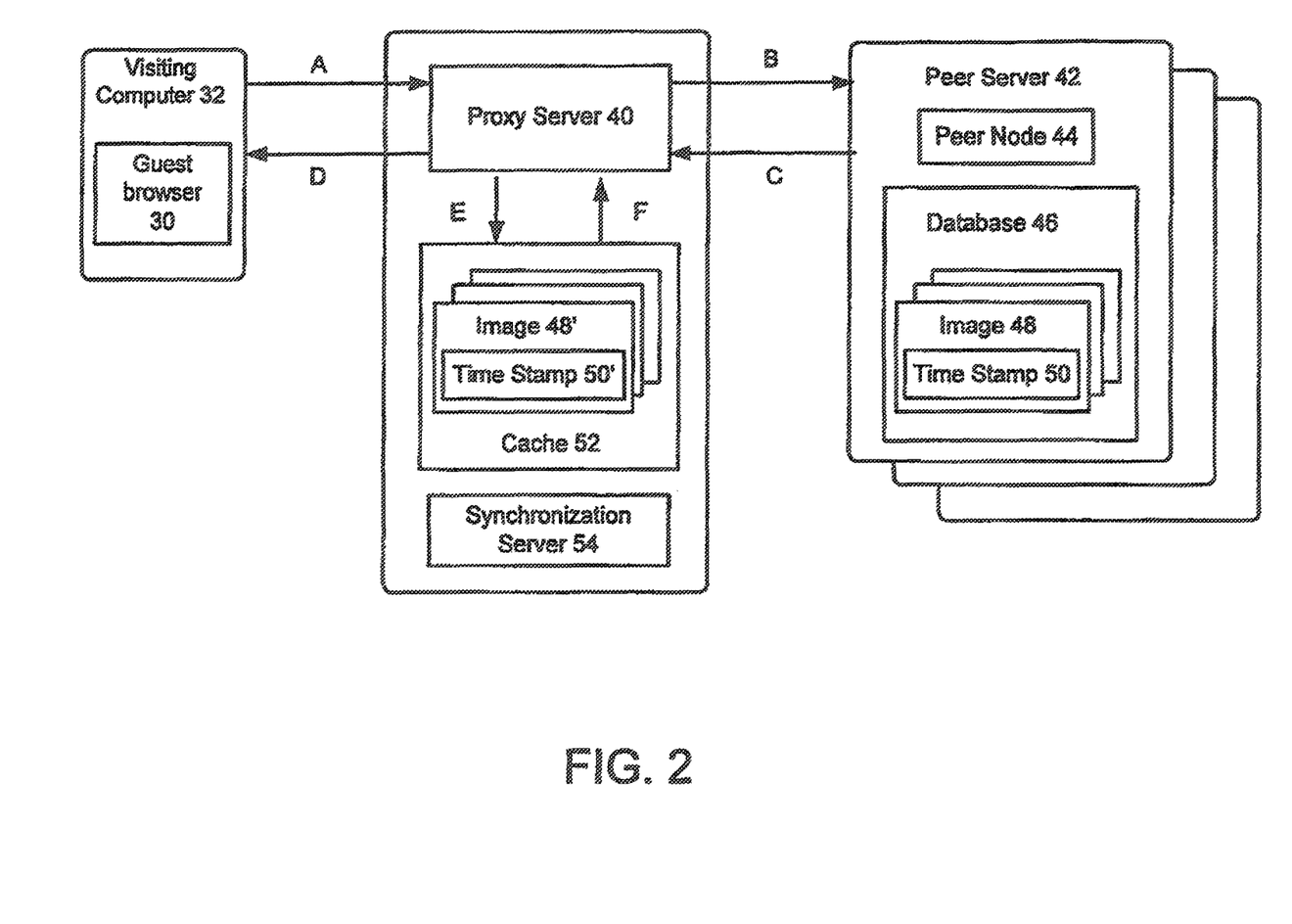
FIG. 2 is a detailed block diagram of an improved photosharing network according to a preferred embodiment of the present invention.

FIG. 2 is a detailed block diagram of an improved photosharing network according to a preferred embodiment of the present invention. Besides the components the shown in FIG. 1A, each peer server 42 includes a peer node application 44 that functions according to the present invention, and a database 46 of stored images 48. The images 48 are typically stored on a hard drive of the hosting computer system, and are given a timestamp 50 by the host operating system that indicates the date of creation or modification date, as is well-known in the art.

The proxy server 40 acts as a proxy for the distributed peer servers 42, which have a pre-established connection to the proxy server 40. The proxy server 40 enables a firewall-protected peer server 42 to enable incoming generic HTTP access by establishing an outbound connection from the firewall-protected peer server 42 with the proxy server 36. Incoming Web traffic for the firewall-protected peer server 42 is then directed to the proxy server 40. The proxy server 40 multiplexes the Web traffic using a proprietary protocol to the peer server 42, thus enabling generic web traffic to flow to the peer server 42 despite the presence of a firewall (not shown). In the case where there are multiple firewall-protected peer servers 42, the proxy server 40 acts as a switchboard to receive and dispatch the incoming HTTP requests to the appropriate peer servers 42. The process for providing Web browsing through a firewall in a peer-to-peer network is described further detail with respect to FIGS. 4 through 6B.

As used herein, the peer servers 24, proxy server 36 and the visiting computer 32 may comprise any computing device, such as PCs, workstations, mobile phones, and PDAs, with components necessary for executing the appropriate software. Also, in a preferred embodiment, the physical communications network is the Internet, although any type of network could be used.

According to the present invention, images 40 stored on the peer server 42 that are requested for viewing by a visiting computer 32, are stored in a cache 52 on the proxy server 40 either before or after the first time the image is requested. Thereafter, subsequent requests for the images are served from the proxy server's cache 52, rather than being fetched from the hosting peer server 42, thus increasing viewing performance. In addition, the proxy server 42 ensures that the cached images 48' are fresh by sending a request to the peer server 42 to check whether a requested image 48' has been modified since being cached. This is accomplished by comparing the timestamp 50' of the cached image 48' with the timestamp 50 of the image 40 stored on the peer server 42. If the comparison of the timestamps indicates that the image 48 on the peer server 42 has been modified, then the peer server 42 transfers the modified image to the proxy server 42 prior to the proxy server 42 serving the image to the requester.

By caching the images 48' on the proxy server 40, the present invention significantly reduces the need to transfer the image 40 from the peer server 42 to the proxy server 40 along path (C) to satisfy each image request, thereby improving the viewing performance of the network. Although a small amount of data is transferred between the proxy server 40 and the peer server 42 in order to determine if the proxy's cache 52 is still fresh, this traffic is generally only a few bytes, as opposed to the kilobytes or megabytes required to transfer images 40 from the peer server 42 to the proxy server 40 for every image request.

Figure 3:
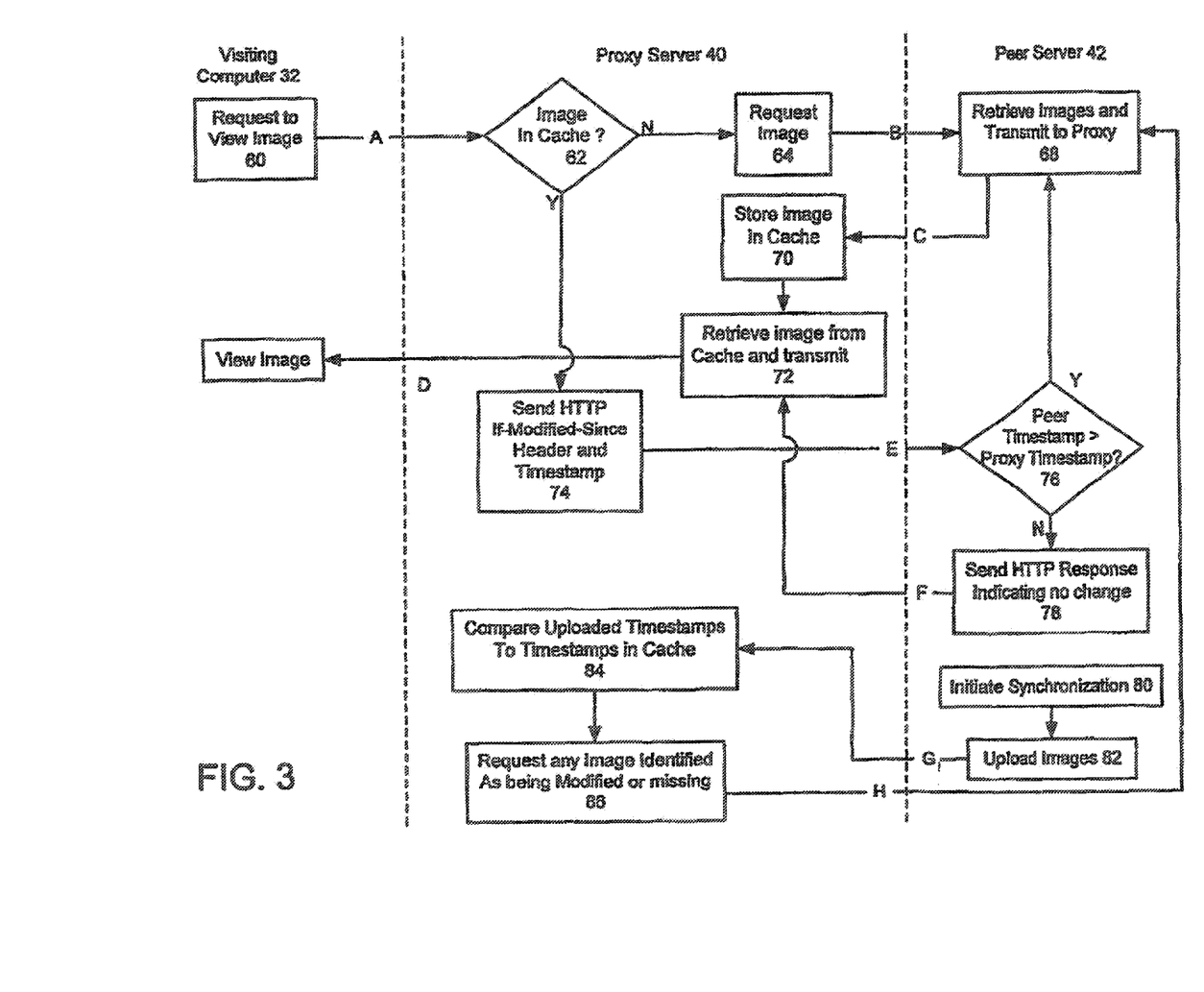
FIG. 3 is a flow diagram illustrating the process for improving guest viewing performance of images stored on peer servers in a photosharing peer-to-peer network.

FIG. 3 is a flow diagram illustrating the process for improving guest viewing performance of images stored on peer servers in a photosharing peer-to-peer network. Referring to both FIGS. 2 and 3, the process begins in step 60 when the visiting computer 32 issues a request to view the image 48 stored in the peer server 42. The request is routed to the proxy server 40 via path (A). In step 62 the proxy server 40 checks if a copy of the image 48' is stored in the cache 52 via path (E). If the copy of the image 48' is not stored in the cache (a cache miss), which may occur the first time an image is requested, then in step 64 the proxy server 40 sends a request for the image to the peer server 42 hosting the requested image 48 via path (B).

In step 68, the peer server 42 retrieves the image 48 and transmits a copy of the image 48 to the proxy server 40 via path (C). In step 70, the copy of the image 48' is stored in the cache 52. In step 72, the proxy server 40 retrieves the cached image 48' via path (F), and serves it to the requesting visiting computer 32 via path (E). In a preferred embodiment, the proxy server 40 streams the image 48' to the visiting computer 32 while the image 48' is being downloaded from the peer server 42 to further reduce the latency between the time that the request is made and the image is returned.

Referring again to step 62, if the image 48' is present in the cache 52 (a cache hit), the proxy server 40 determines if the cached image 48' is still fresh in step 74 by sending a request to the peer server 42 in the form of a standard HTTP "If-Modified-Since" header with the timestamp 50' of the cached image 48' via path (B). In step 76, the peer node application 44 on the peer server 42 compares the timestamp 50' of the cached image 48' with the timestamp 50 of the image 40 stored on the peer server 42. If the timestamp 50 of the image 48 stored on the peer server 42 is different (i.e., newer) than the timestamp 50' of the cached image 48', then the peer server 42 determines that the image 48 on the peer server 42 has been modified since the image was cached (stale cache). In step 68, the peer server 42 returns a copy of the image 48 as a response via path (C).

If the peer server 42 determines that the image 48 it has stored locally does not having newer timestamp 50 than the timestamp 50' sent by the proxy server 40 in step 76, then in step 78, the peer server 42 sends a 304 HTTP return code to the proxy server 40 as a response indicating that the image has not been modified via path (C). The proxy server 40 then retrieves the image 48' from the cache 52 via path (F) and serves it to the visiting computer 32 via step 72 via path (D).

From time to time, the peer server 42 will become disconnected from the proxy server 40, especially in home environments where users often shut down their PCs when not in use. In this case, the proxy server 40 cannot communicate to the peer server 42 to determine if the images 48' in the cache 52 are still valid. Therefore, the proxy server 40 needs an updated set of the most current images and web page components surrounding those images before the peer server 42 goes off-line.

According to a further aspect of the present invention, this is handled via the synchronization server 54 (FIG. 2) and a synchronization protocol. Referring to both FIGS. 2 and 3, in operation, the user may initiate the synchronization protocol between the peer server 42 and the synchronization server 54 in step 80 prior to disconnecting the peer server 42. In a preferred embodiment, the user interface of the peer node 44 displays a peer synchronization icon or menu item that the user may select. Alternatively, the user may be prompted to perform synchronization, which the user may choose to accept or declined.

Once synchronization is invoked, in step 82 the peer server 42 uploads the timestamps 50 of all the images 48 to the synchronization server 54 via path (C). In step 84, the synchronization server 54 compares the uploaded timestamps 50 to the timestamps 50' to determine if the cached images 48' are current and whether there are any missing images in the cache 52. In step 86, the synchronization server 54 sends a request to the peer server 42 for any images identified as being modified or missing. In step 68, the peer server 42 retrieves and transmits the requested images 48 to the proxy server 40 via path (C).

In a preferred embodiment, synchronization is performed immediately upon request by the user. However, in an alternative embodiment, synchronization may be performed automatically in the background. That is, the proxy server 40 may be synchronized with the peer server 42 at the same time the proxy server 40 is serving images to the visiting computer 32. In this embodiment, synchronization may be performed when the peer server 42 first makes a connection to the proxy server 40. Background synchronization may also be performed when it is detected that the peer server's connection is idle. In either form of background synchronization, by time the user shuts down the peer server 42 after an active session, synchronization with the proxy server 44 may be more than, likely complete.

In a preferred embodiment, the synchronization server 54 is a component of the proxy server 40. However, the synchronization server 54 may separate from the proxy server 40 and run on a separate computer.

As can be seen, an image is only transferred from the peer server 42 to the proxy server 40 via path (C) when it is not present in the cache 52, which is typically the case the very first time the image is request, and when the image in the cache 52 needs to be updated. However, other than the first time the image is requested, the image will be present in the cache 52, and the only data passed between the peer server 42 to the proxy server 40 via path (C) is the HTTP return code, which is only a few bytes, rather than megabytes to transfer the image. Due to this decrease in traffic between the peer server 42 to the proxy server 40, image viewing performance of the P2P network for guests is significantly increased.

Figure 4:
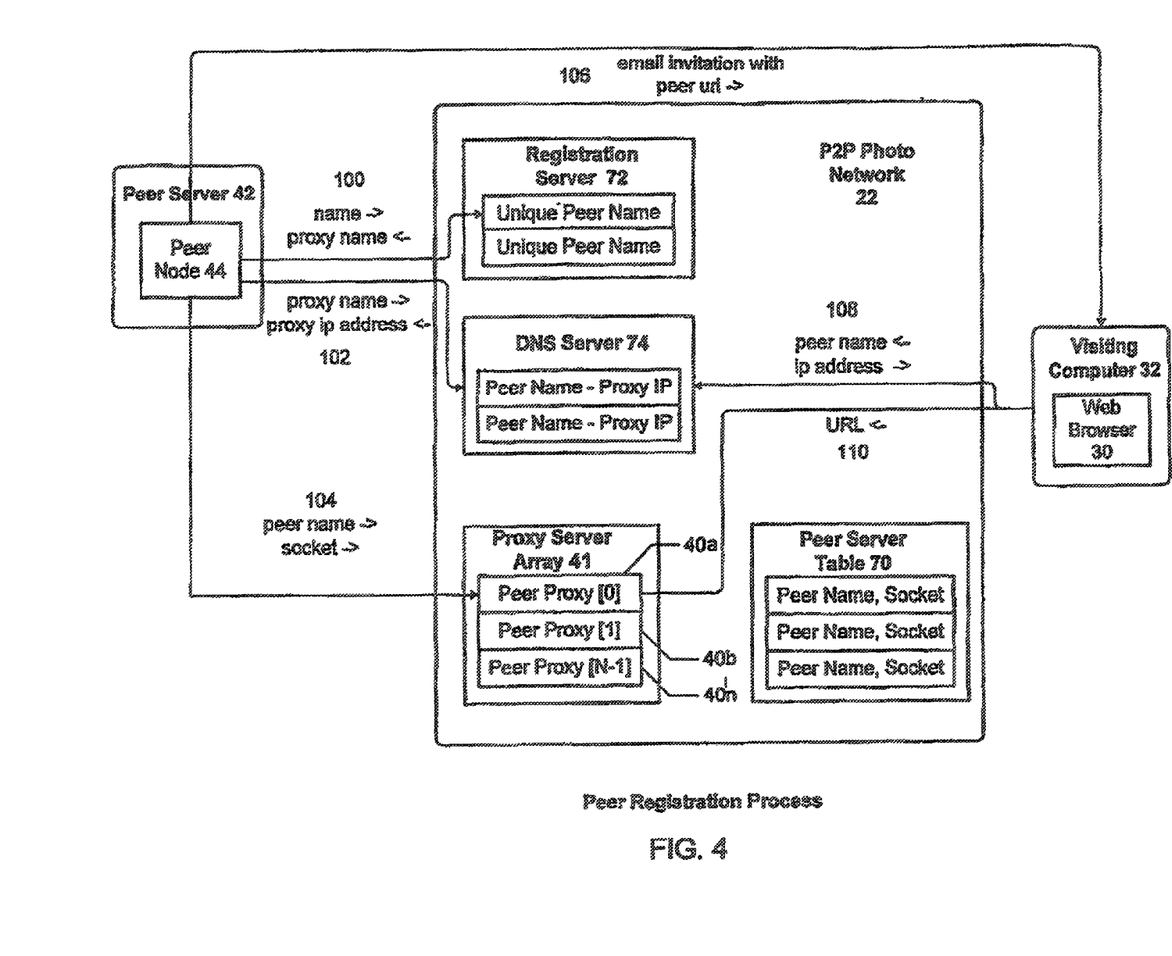
FIG. 4 is a flow diagram illustrating the process of a peer server registering with the photosharing peer-to-peer network to make its serving capabilities assessable through a firewall.

FIG. 4 is a flow diagram illustrating the process of a peer server 42 registering with the photosharing peer-to-peer network 22 to make its serving capabilities assessable through a firewall 34. In a preferred embodiment, the P2P network 22 includes several proxy servers 40*a-n*, referred to collectively as proxy server array 40, a peer server table 70, a registration server 72, and a DNS server 74.

The registration process begins in step 100, in which the peer node 44 passes its name to the registration server 72, the registration server 72 checks to make sure that the peer name is unique, and returns to the peer node 44 the name and IP address of the proxy server 40 to which it is assigned. In step 102, the peer node 44 registers its proxy server name and proxy server IP address with the DNS server 74. The DNS server 74 maintains a table of all peer names and their corresponding proxy IP addresses. In step 104, the peer node 44 registers the peer server's name and socket to proxy server 40 to which it was assigned.

In step 106, a user of the visiting computer 32 is notified that content (e.g., photos) exists on the peer server 42 for viewing. The notification could be implemented using several methods, but in a preferred embodiment, the user is notified via e-mail, with the e-mail including the URL of the content in the peer server 42. In step 108, the user of the visiting computer 32 receives the e-mail, and clicks on the URL. Using the peer name in the URL, the visiting computer 32 contacts the DNS server 74 to determine the identity of the proxy server 40 in which to send the request. The DNS server 74 responds with the IP address of the proxy server 40 assigned to the peer server 42. Given the proxy IP address, the web browser 30 of the visiting computer 32 sends an HTTP request to the proxy server 40 in step 110.

Figure 5:
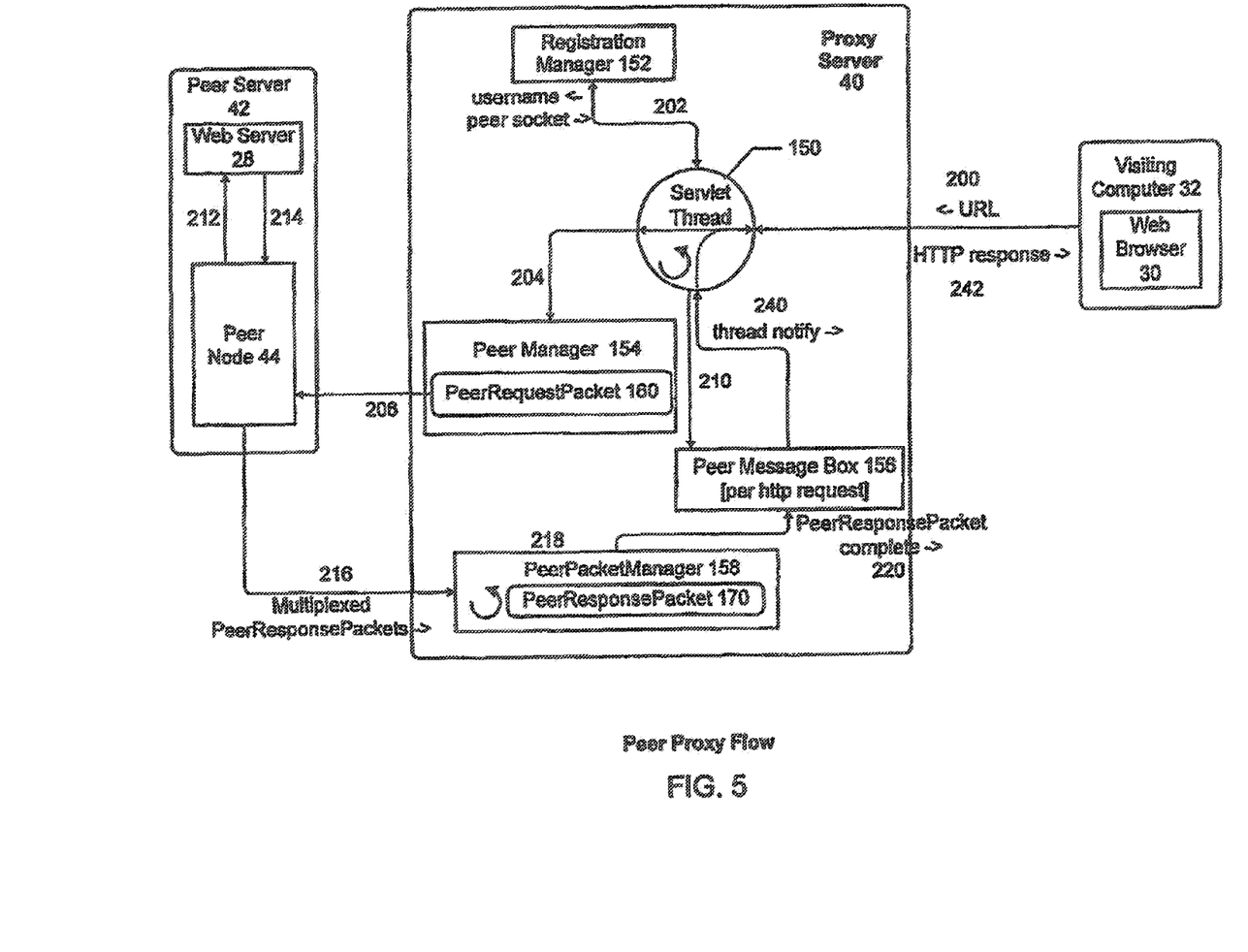
FIG. 5 is a diagram illustrating components of the proxy server and the flow between the requesting web browser, the proxy server, and the peer server to enable the web browser to have HTTP access to the peer server through the proxy server.

FIG. 5 is a diagram illustrating components of the proxy server 40 and the flow between the requesting web browser 30, the proxy server 40, and the peer server 42 to enable the web browser 30 to have HTTP access to the peer server 42 through the proxy server 40. In a preferred embodiment, the proxy server 40 includes multipleservlet threads 150, a registration manager 152, a peer manager 154, a peer Message-Box 156, and a peer packet manager thread 158.

The process begins in step 200 when the servlet thread 150 in the proxy server 40 receives the HTTP request in the form of a URL from the web browser 30. In step 202, the registration manager 152 checks the server table 70 (see FIG. 4) to determine if the peer server identified in the requesting URL is registered with the peer server 42, and if so, returns the corresponding peer socket. In step 204, the servlet thread 150 creates a peer request packet 160 from the HTTP request and then passes that packet to the peer manager 154.

Figure 6A:
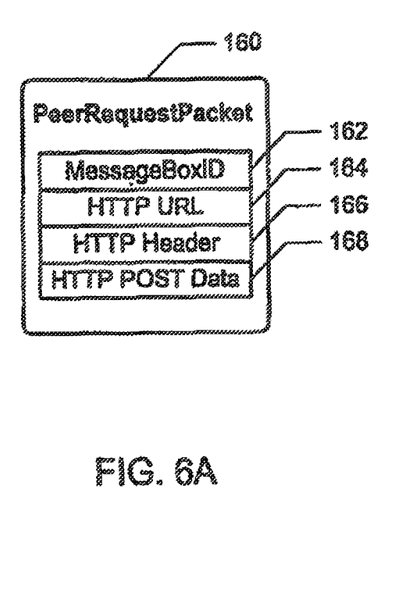
FIG. 6A is a diagram illustrating the contents of a peer request packet.

FIG. 6A is a diagram illustrating the contents of a peer request packet 160. In a preferred embodiment, the peer request packet 160 includes a MessageBoxID 162, an HTTP URL 164, multiple HTTP headers 166, and an HTTP Post Data field 168. The MessageBoxID 162 is a unique identifier for correlating peer request packets 162, peer response packets 170, and peer message boxes 156. The HTTP URL 164 is the URL that was requested from the visiting web browser 30. The HTTP Headers 166 is the HTTP headers from the original request from the visiting web browser 30. The HTTP Post Data field 168 contains data for when the request is a POST command, and not a GET command.

Referring again to FIG. 5, in step 206, the peer manager 154 finds the socket connection to the peer server 42 and passes the peer request packet 160 to peer server 42. In step 210, the servlet thread 150 gets a peer MessageBox 156 from the peer manager 154 and blocks, waiting for response packets to arrive in the peer MessageBox 156.

In step 212, the peer node 44 receives the request packet 160, converts the packet 160 back into an HTTP request, and sends the HTTP request to the web server 28. In step 214, an HTTP response is sent from the web server 28 to peer node 44, which then takes the HTTP headers from the response, creates a peer response packet 170, and sends it back to the proxy server 40. The remaining portion of the HTTP response is broken up into 2K chunks in step 216 and sent to the proxy server 40 in successive peer response packets 170. In a preferred embodiment, the peer node 44 inserts a routing address with each peer response packet 170. Note that there can be several threads handling request from the proxy server 40. Therefore, the peer node 44 multiplexes those responses over the same response socket back to the proxy server 40.

Figure 6B:
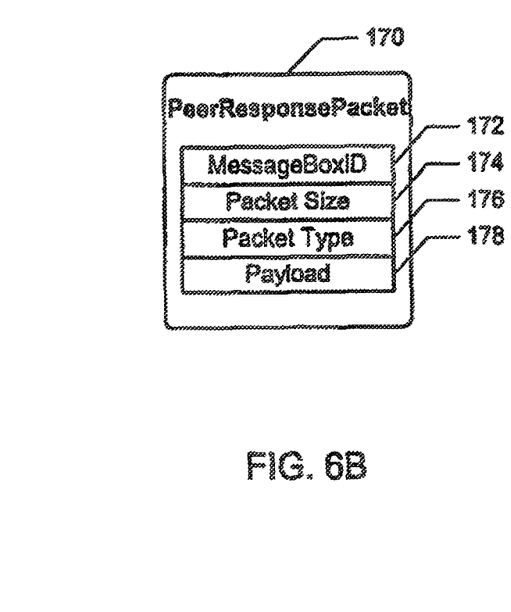
FIG. 6B is a diagram illustrating the contents of a peer response packet.

FIG. 6B is a diagram illustrating the contents of a peer response packet 170. In a preferred embodiment, the peer response packet 170 includes a MessageBoxID 172, a packet size 174, a packet type 176, and a payload field 178. The MessageBoxID 172 is a unique identifyer for correlating peer request packets 162, peer response packets 170, and peer message boxes 156. The packet size 174 has to do with the fact that the response to the peer request packet 160 is sent back to the proxy server 40 in chunks. A packet size of 2K is used in the preferred embodiment. The individual packets are reassembled on the proxy server 40 to form the complete HTTP response, which is then returned to the visiting web browser 30. The packet type 176 indicates the type of data being returned in the payload field 178. Possible values include: [data, header, final packet]. The payload field 178 is the data portion of the peer response packet 170.

Referring again to FIG. 5, in step 218, the proxy server 40 receives raw bytes over the response socket and passes them to a peer packet manager 158 thread selected from a thread pool. In a preferred embodiment, there is only one peer packet manager thread per peer that is actively receiving requests 158 in the proxy server 40 170. In step 220, the peer packet manager thread 158 waits until there is a complete packet in its buffer, then routes the complete peer response packet 170 to the corresponding peer MessageBox 156. When the packet 170 arrives in the peer MessageBox 156, the corresponding servlet thread 150 wakes up and retrieves the complete peer response packet 170. In step 242, the servlet thread 150 converts the peer response packet 170 back into an HTTP response and then sends the HTTP response back to the requesting web browser 30. As disclosed herein, a combination of the proxy server 40 and the peer node 44 enable HTTP access to a peer server 42 located behind a firewall 34 by a visiting web browser 30.

The present invention has been described in accordance with the embodiments shown, and one of ordinary skill in the art will readily recognize that there could be variations to the embodiments. For example, while the preferred embodiment has been described in relation to a web-based peer-to-peer network, those skilled in the art would readily appreciate that the same principles can be applied to a conventional client-server environment where the client computer communicates directly with the peer server without utilizing the proxy server. Any variations would be within the spirit and scope of the present invention. Accordingly, many modifications may be made by one of ordinary skill in the art without departing from the spirit and scope of the appended claims.

What is claimed is:

1. In a network system having a client coupled with a server, a method for serving an image stored in the client to a requesting client, comprising:
   (a) caching a copy of the image in the server;
   (b) receiving a request for the image from the requesting client;
   (c) in response to the server receiving the request from the requesting client for the image stored in the client, sending a request from the server to the client to determine if the image has been modified;
   (d) if a response from the client indicates that the image has not been modified, transmitting the cached image from the server to the requesting client;
   (e) if the image has been modified, caching a copy of the modified image on the server, and transmitting the modified image from the server to the requesting client; and
   (f) synchronizing the server with the client as a background process during image transmission of the cached image between the server and the requesting client, wherein during synchronization, the client uploads a timestamp associated with an image stored on the client.

2. The method of claim 1 wherein step (c) further includes: sending the request to the client as an HTTP request.

3. The method of claim 2 wherein step (c) further includes: sending an HTTP If-Modified-Since header and a timestamp of the cached image as the request.

4. The method of claim 3 wherein step (c) further includes: in response to the client receiving the HTTP request,
   (i) comparing the timestamp for the cached image with a timestamp of the image stored on the client;
   (ii) if the timestamps are different, responding by transferring the modified image to the server; and
   (iii) if the timestamps are not different, sending the response indicating that the image has not been modified.

5. The method of claim 1 wherein step (a) is performed a first time the image is requested.

6. The method of claim 1 further comprising:
   during the synchronization, uploading the timestamp to the server; and
   comparing the timestamp to timestamps for cached images to determine if the cached images are current and to determine whether any images are missing from the cache.

7. The method of claim 6 further comprising: sending a request from the server to the client for an image identified as being modified or missing, thereby synchronizing the images cached on the server with the images stored on the client.

8. The method of claim 7 wherein the server includes a synchronization server for performing the timestamp comparisons.

9. The method of claim 1 wherein the server comprises a proxy server that provides the requesting computer HTTP access to the client when located behind a firewall.

10. The method of claim 1, wherein the client is a computing device.

11. The method of claim 1, wherein the client is a mobile phone.

12. The method of claim 1, wherein the requesting client is a computing device.

13. The method of claim 1, wherein the requesting client is a mobile phone.

14. The method of claim 1, wherein the server is a network server.

15. A server comprising:
   a computer processor; and
   memory storing code configured to execute on the computer processor, the code configured to:
      cache a copy of an image that is stored at a client;
      receive a request for the image from a requesting client;
      in response to receiving the image request, send a request to the client to determine if the image has been modified;
      transmit the cached image from the server to the requesting client if a response from the client indicates that the image has not been modified;
      cache a copy of a modified image on the server if the image has been modified, and transmit the modified image from the server to the requesting client; and
      synchronize the server with the client as a background process during image transmission of the cached image between the server and the requesting client, wherein during synchronization, the client uploads a timestamp associated with an image stored on the client.

16. The server of claim 15 wherein the code is further configured to send the request to the client as an HTTP request.

17. The server of claim 16 wherein the code is further configured to send an HTTP If-Modified-Since header and a timestamp of the cached image as the request.

18. The server of claim 17 wherein the client is configured to:
   compare the timestamp for the cached image with a timestamp of the image stored on the client;
   if the timestamps are different, respond by transferring the modified image to the server; and
   if the timestamps are not different, send the response indicating that the image has not been modified.

19. The server of claim 15 wherein the image is cached a first time the image is requested.

20. The server of claim 15 wherein during the synchronization, the timestamp is uploaded to the server and compared to timestamps for images in the cache to determine if the cached images are current and whether any images are missing in the cache.

21. The server of claim 20 wherein a request is sent from the server to the client for an image identified as being modified or missing, thereby synchronizing the images cached on the server with the images stored on the client.

22. The server of claim 21 wherein the server includes a synchronization server for performing the timestamp comparisons.

23. The server of claim 15 wherein the server comprises a proxy server that provides the requesting computer HTTP access to the client when located behind a firewall.

24. The server of claim 15, wherein the client is a computing device.

25. The server of claim 15, wherein the client is a mobile phone.

26. The server of claim 15, wherein the requesting client is a computing device.

27. The server of claim 15, wherein the requesting client is a mobile phone.

28. The server of claim 15, wherein the server is a network server.

29. A non-transitory computer-readable medium containing program instructions for serving an image stored on a client to a requesting client in a network system where the client is coupled to a system server, the instructions for:
   (a) caching a copy of the image in the server;
   (b) receiving a request for the image from the requesting client;
   (c) in response to the server receiving the request from the requesting client for the image stored in the client, sending a request from the server to the client to determine if the image has been modified;
   (d) if a response from the client indicates that the image has not been modified, transmitting the cached image from the server to the requesting client;
   (e) if the image has been modified, caching a copy of the modified image on the server, and transmitting the modified image from the server to the requesting client; and
   (f) synchronizing the server with the client as a background process during image transmission of the cached image between the server and the requesting client, wherein during synchronization, the client uploads a timestamp associated with an image stored on the client.

30. The non-transitory computer-readable medium of claim 29 wherein instruction (c) further includes: sending the request to the client as an HTTP request.

31. The non-transitory computer-readable medium of claim 30 wherein instruction (c) further includes: sending an HTTP If-Modified-Since header and a timestamp of the cached image as the request.

32. The non-transitory computer-readable medium of claim 30 wherein instruction (c) further includes: in response to the client receiving the HTTP request,
   (i) comparing the timestamp for the cached image with a timestamp of the image stored on the client;
   (ii) if the timestamps are different, responding by transferring the modified image to the server; and
   (iii) if the timestamps are not different, sending the response indicating that the image has not been modified.

33. The non-transitory computer-readable medium of claim 29 wherein instruction (a) is performed a first time the image is requested.

34. The non-transitory computer-readable medium of claim 29 further comprising:
   during the synchronization, uploading the timestamp to the server; and
   comparing the uploaded timestamp to timestamps for cached images to determine if the cached images are current and whether any images are missing in the cache.

35. The non-transitory computer-readable medium of claim 34 further comprising: sending a request from the server to the client for an image identified as being modified or missing, thereby synchronizing the images cached on the server with the images stored on the client.

36. The non-transitory computer-readable medium of claim 35 wherein the server includes a synchronization server for performing the timestamp comparisons.

37. The non-transitory computer-readable medium of claim 29 wherein the server comprises a proxy server that provides the requesting computer HTTP access to the client when located behind a firewall.

38. A non-transitory computer-readable medium containing program instructions for instructing a client coupled to a server, the instructions for:
- (a) displaying an icon on the client for updating a cached image on the server;
- (b) in response to a user selecting the icon, sending a request including a timestamp associated with the new image to the server to update a cached version of an image with the new image;
- (c) receiving a response from the server requesting the new image when a timestamp of the cached version of an image is different than the timestamp of the new image; and
- (d) transmitting the new image to the server in response to receiving the request for the new image.

* * * * *